United States Patent [19]

Melander et al.

[11] Patent Number: 4,732,233

[45] Date of Patent: Mar. 22, 1988

[54] APPARATUS FOR REDUCED TEAR PROPAGATION

[75] Inventors: Clarence S. Melander, West Covina; Ralph Lewis, Jr., Cypress, both of Calif.

[73] Assignee: The B. F. Goodrich Company, Akron, Ohio

[21] Appl. No.: 935,864

[22] Filed: Nov. 28, 1986

[51] Int. Cl.$^4$ .............................................. A62B 1/20
[52] U.S. Cl. .................................. 182/48; 193/25 B; 244/905
[58] Field of Search ................. 182/48, 49; 193/25 B, 193/25 R; 244/137 P, DIG. 2

[56] References Cited

U.S. PATENT DOCUMENTS 4,274,526  6/1981  Sims ...................................... 182/48
4,378,861  4/1983  Burrough .............................. 182/48

Primary Examiner—Reinaldo P. Machado
Attorney, Agent, or Firm—Woodrow W. Ban

[57] ABSTRACT

An improved emergency slide evacuation device wherein a second ply substantially parallels a sliding ply of the emergency slide evacuation device but remains substantially unattached to the sliding ply except for edge portions of the second ply whereby the second ply supports the sliding ply in the event of tears or rips in the sliding ply but remains at least partially isolated from the forces being applied to the sliding ply to effect tearing or ripping. The improvement finds use particularly in the fabrication of aircraft evacuation slides.

8 Claims, 1 Drawing Figure

APPARATUS FOR REDUCED TEAR PROPAGATION

FIELD OF THE INVENTION

This invention relates to structures susceptable to damage by the propagation of tears within components of the structure and more particularly this invention relates to fabric structures susceptible to damage as a result of the propagation of tears in fabric plies comprising the structure. Specifically, this invention relates to slide-type evacuation device used in connection with aircraft and other objects requiring slide-type evacuation capability and to the reduction of tear propagation in such slide-type devices, particularly where formed of plies of a fabric material.

BACKGROUND OF THE INVENTION

The use of slides for the movement of persons and chattel property from one point to another is well known. Slides for chattel property have found frequent use for manufacturing operations in the handling of bulk goods. Slides for the movement of animals and people have found less acceptance traditionally, due perhaps in part to the relatively uncontrolled nature of the sliding movement connected therewith and the possibility for resultant injury together with, at least for persons, a relatively undignified experience generally associated with travel by slide.

Yet slides have found a nitch in the movement of persons as well as in the movement of goods and other chattel property. In addition to chattel property uses, slides have found particularly utility in providing relatively rapid emergency egress from places of heightened danger. For example, slides have found a substantial acceptance in providing emergency egress from aircraft and from building structures containing processes and the like having a capability for becoming dangerous to human life in a very short time period.

For movement of chattel property, slides typically been formed from metals and other sturdy materials configures and supported in a permanent or semi-permanent arrangement. For the occasional or emergency movement of goods, animals and people, slides more typically have been of a temporary nature and have been formed from fabric or textile plies and collapsed for compact storage until needed. Such collapsed, fabric ply slides typically have been configured for rapid erection such as by the inflation of tubular supports integral thereto establishing a structural framework for a fabric ply sliding surface.

One typical such emergency slide can be found incorporated in the door assemblies of many airliners. The slide typically consists of a pair of tubular support members configured for rapid inflation employing a source of pressurized air carried aboard the aircraft. The tubular support members typically are interconnected by a sliding surface. The sliding surface and the tubular support members typically are formed from one or more plies of a rubberized fabric.

In use, these rubberized fabric structures can develop punctures; the punctures can evolve into tears under the strains and stresses of use, which tears can leave a slide unusable before the emergency for which it has been deployed has passed. In the past, where such slides have been formed from fabric plies impregnated or coated with a rubberizing compound and the curingly vulcanized to produce a rubber slide surface, it has been suggested that a plurality of rubberized plies vulcanizably joined could be employed to form the slide thereby, hopefully, through additive effect of the strengths of the plurality of the plies, providing greater tear retardation. The inclusion of additional plies, however, can add considerably to the weight of any such slide. Where such slides are employed, for example, in aircraft or other weight sensitive applications, the additional weight imposed by additional plies of rubberized fabric can be unacceptable.

Likewise, past suggestions have opposed the use of heavy or stronger, more tear resistant fabrics in forming a rubberized ply configured to perform as a sliding surface. Such heavier fabrics, particularly when containing or including sufficient rubberizing compound can add unacceptably to the weight of such slide in weight sensitive applications.

A slide means and method having in substantial proportion the low weight advantages associated with single ply coated fabric slide structural configurations while providing strength and tear propagations resistance substantially more elevated than those commonly associated with relatively lightweight single ply coated fabrics, could find substantially utility in the fabrication of evacuation slides for use, primarily during emergencies, in evacuating aircraft, elevated trains, and other structures such as explosives factories not readily accessible employing stairs or other typical means of evacuation during times of emergency.

SUMMARY OF THE INVENTION

The present invention provides an improvement to devices wherein a flexible sliding ply bridges between a pair of supports for the sliding ply to establish a sliding structure for effecting a pathway for the sliding movement of objects between a pair of points and wherein the sliding ply is subject to failure by reason of tears or rips. A second ply of an elevated tear strength fabric is positioned closely adjacent a surface of the sliding ply obverse to the surface of the sliding ply upon which objects are slid. The second ply is attached at edges thereof to either the sliding ply or the supports for the sliding ply but otherwise remains substantially unaffixed to the sliding ply between such edge attachments.

In preferred embodiments, the sliding ply is formed of a coated fabric and the second ply is formed of an uncoated fabric having a tear strength or resistance to tear propagation greater than a tear strength or resistance to tear propagation associated with the sliding ply. More preferably the second ply tear strength exceeds that of the sliding ply by at least 100% and preferably by 500%.

In preferred embodiments, the device of the invention is an evacuation slide having a sliding ply forming a slide floor, the sliding ply being formed of a single ply of a fabric, typically nylon, coated with a rubberizing compound and curingly vulcanized. The sliding ply is affixed to a pair of supports to establish a slide structure. The supports typically are tubular structures formed from a rubberized fabric with the sliding ply being joined to the inflatable tubular structures by adhesive, stitching, or curing vulcanization techniques. The second ply, attached to the sliding ply by adhesive, curing vulcanization, or stitching techniques, is formed from a high tear strength fabric mesh such as a polyamide fabric. The second ply is attached to the sliding ply substantially only along edges of the second ply. Alternately the second ply may be attached to the tubular support structures for the sliding ply applying adhesive, curing vulcanization, or stitching techniques. Regardless of how applied, the second ply is provided to be in substantially close alignment with the sliding ply but other than possible periodic spot or narrow-line attachments remains substantially unattached to the sliding ply and any edge attachments.

The above and other features and advantages of the invention become more apparent when considered in light of a detailed description of the invention together with a drawing which follow, together forming a part of the specification.

BEST EMODIMENT OF THE INVENTION

Figure 1:
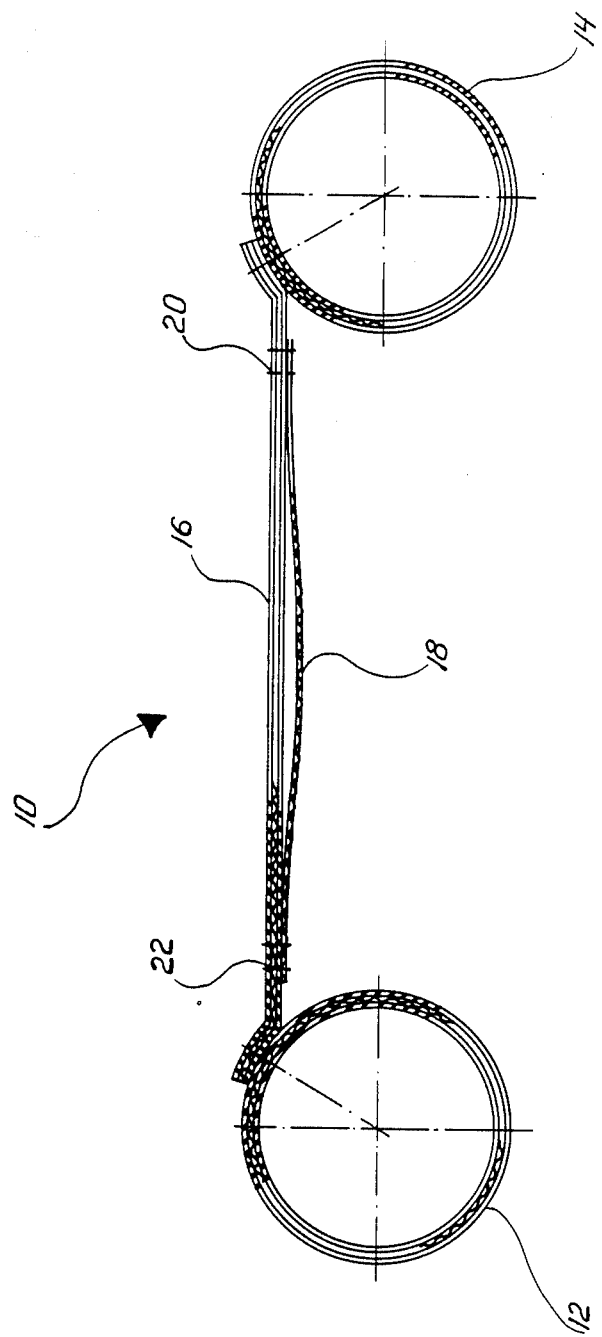
FIG. 1 is a cross sectional view of a slide device made in accordance with the invention.

Referring to the drawings, FIG. 1 is a representation in cross section of a sliding device 10 made in accordance with the invention. The device 10 includes a pair of tubular structural supports or members 12, 14 and a sliding ply 16 supported by the tubular supports 12, 14.

The supports 12, 14 typically are formed from a fabric coated with a rubberizing compound on one or both surfaces. Such coated fabrics are well known, readily commercially available, and typically are comprise a nylon mesh fabric coated with a chlorinated rubber or polyurethane on one or both surfaces.

The tubular supports 12, 14 are formed in well known manner and are configures for inflation in any suitable or conventional manner. Inflation means typically relying upon a bottled gas for such tubular structural members 12, 14 are well known in the art of aircraft evacuation slides.

The sliding ply 16 is formed from a single ply of a fabric coated with a rubberizing compound such as, without limitation, a rubber, chlorinated rubber, or a urethane. The coated fabric forming the sliding ply 16 may be identical to or different from that coated fabric forming the tubular structures 12, 14. The selection of a particular rubberized fabric for forming a sliding ply is a function of the load that it must bear, its tear resistance, span, the desired sliding coefficient of friction, and other usual or conventional engineering considerations. The sliding ply is attached to the tubes 12, 14 in suitable or conventional well known manner such as by adhesive bonding, curing vulcanization, or a combination thereof. In a typical application such as an aircraft evacuation slide, the sliding ply 16 is possessed of a tear strength or resistance to tear propagation in the fabric warp direction of 13 pounds and in the fill fabric direction of 13 pounds. Tear strength or resistance to tear propagation is determined according to Federal Standard 191 for textile test methods. Method 5136 (as promulgated by an agency of the United States Government). Such sliding ply fabrics typically, in aircraft evacuation slide application, are possessed of a puncture resistance of 45 pounds as determined by MIL-T-6396E. As may be seen, the puncture resistance is roughly three times the resistance to tear propagation for the fabric.

A second, or backup ply 18 is provided in the device 10. The backup ply 18 is affixed to the sliding ply at attachment points 20, 22 which correspond to a longitudinal edge attachment of the backup ply 18 to the sliding ply 16. This attachment can be accomplished in a suitable or conventional manner such as curing vulcanization associated with the application of an effective amount of rubberizing compound to the edges of the backup ply 18, adhesive techniques, stitching or a combination thereof.

The backup ply 18 is formed from a fabric having at least as great a resistance to tear propagation as the sliding ply 16. Preferably this resistance to tear propagation or tear strength is 100% greater than the tear strength associated with the sliding ply 16, and most preferably this tear strength is 500% of the tear strength associated with the sliding ply 16.

The backup ply 18 is configured to relatively closely conform to the sliding ply 16. By the term relatively closely conform, what is meant is to generally parallel the sliding ply with a gap or sag of not more than about two inches (5 cm) existing between the backup ply 18 and the sliding ply 16 while the tubular structures 12, 14 are inflated and the slide is ready for use. Preferably, any such gap does not exceed one inch (2.5 cm).

The backup ply 18 remains substantially unattached, unconnected or unjoined to the sliding ply 16 other than at the points of attachment 20, 22. By substantially unattached, unconnected or unjoined what is meant is that except for intermediate lines or spots of attachment between the edge attachments to prevent or forestall excessive sagging or to maintain a desired gap between the plies 16, 18, the ply 18 remains within generally desired limits, that is less than about two inches (5 cm) and preferably less than about one inch (2.5 cm).

It should be apparent that the backup ply 18 alternately can be attached to the tubes 12, 14 or in a still further alternate may be joined with the sliding ply 16 at the connection between the sliding ply 16 and the tubes 12, 14. Conventional methods for effecting the jointure of fabric plies in an inflatable structure generally are well known in the art of aircraft evacuation slides.

It should be apparent that the tubular supports 12, 14 can be tubular structures other than inflatable tubes. Telescoping tubular metal devices or other tubular structures and configurations may be employed in lieu of inflatable tubes in providing the supports 12, 14 in the practice of the invention. Suitable or conventional means of attachment between the sliding ply 16 and any such structures 12, 14 may be employed. Typically such attachment means would include clips, lacing, and wrapping of the ply 16 about the tubular structures 12, 14 and attaching the ply 16 to itself by stitching, adhesive or vulcanization techniques.

The backup ply 18 can be formed of any suitable or conventional highly tear resistant material. Preferred in the practice of the invention are uncoated nylon and polyamide fabrics, but it is believed that uncoated polyester fabrics, rayon fabrics, and wire fabrics may be employed in the practice of the invention. By the term coated as used herein, what is meant is a coating upon at least one surface of the fabric of a rubber, chlorinated rubber, urethane or the like.

It is a surprising result of the invention that a structure including a sliding ply 16 and a backup ply 18 substantially unattached to the sliding ply except at edge attachment points 20, 22 provides greater tear resistance and puncture resistance that two plies of coated fabric curingly laminated to form a sliding structure where the plies, before lamination, have individual tear resistance as corresponding to the tear resistances of plies 16, 18 in the unattached ply structure of the invention. It is believed that coating of a fabric with a rubberizing compound effectively reduces the tear resistance of the fabric and the laminating together of plies of coated fabric further reduces the otherwise additive effect to be expected from the addition of the tear resistance associated with one coated fabric ply to that of a laminatably attached second ply of a coated fabric. Accordingly, Applicants have discovered that the combination of a sliding ply 16 and a backup ply 18 substantially unattached to the sliding ply except at edge attachment portions thereof provides greater tear propagation resistance than where the same plies are both formed of coated fabric and laminatably attached. It is believed that the non-joinder between the plies 16, 18 permits the ply 18 to support the ply 16 in an area about any tear or rip without being subjected to strains or stresses associated with the point at which the tear or rip is propagating in the ply 16 and thereby freeing the ply 18 substantially from transmittal of those tearing ripping forces at the point of application so as to provoke a tear or rip in the ply 18.

In a device wherein a flexible sliding ply having a particular tear resistance and subjected to a tearing force bridges between a pair of supports for the sliding ply to establish a sliding structure for effecting a pathway for the sliding movement of objects between a pair of points, tear resistance of the slide structure can be improved by providing a second ply having a tear resistance at least greater than that of the sliding ply and positioning the second ply closely adjacent to the surface of the sliding ply obverse to a surface of the sliding ply upon which objects are to be slid. The second ply is attached at edges thereof to either the sliding ply or the supports for the sliding ply but the second ply remains substantially unaffixed to the sliding ply between such edge attachments. Preferably the second ply is provided to have at least 100% and preferably at least about 500% greater tear resistance than a tear propagation resistance associated with the sliding ply. Preferably the second ply is formed of polyamide fabric while the sliding ply is formed from a fabric having a rubberizing compound applied to at least one surface thereof.

While a preferred emboidment of the invention has been shown and described in detail it should be apparent there is modification may be made thereto without departing the scope of claims as follows:

What is claimed is:

1. In a device wherein a flexible sliding ply bridges between a pair of supports for the sliding ply to establish a sliding structure for effecting a pathway for the sliding movement of objects between a pair of points, and wherein the sliding ply is subject to failure by reason of tears or rips, the improvement comprising:

a second ply of an elevated tear propagation resistance fabric positioned closely adjacent a surface of the sliding ply obverse to a surface upon which objects are slid, the second ply being attached at edges thereof to one of the sliding ply and the supports but being otherwise substantially unaffixed to the sliding ply between the edge attachment; the sliding ply being formed of a coated fabric; the second ply being formed of a fabric having a tear propagation resistance greater than the tear propagation resistance of the sliding ply.

2. The device of claim 1, the second ply having a tear propagation resistance at least 100% greater than that of the sliding ply.

3. The device of claim 1, the second ply having a tear propagation resistance at least 500% greater than that of the sliding ply.

4. The device of claim 1, the second ply being formed from an uncoated ply of polyamide fabric.

5. In an evacuation slide wherein a flexible sliding ply formed from a fabric coated with a rubberizing compound on at least one surface thereof bridges between a pair of inflatable tubular supports for the sliding ply to establish a sliding structure to establish a pathway for the sliding movement of persons between an elevated point from which escape is desired and a lower point of relative safety, and wherein the sliding ply is subject to failure by reasons of tears or rips, the improvement comprising:

a second ply of fabric having a tear propagation resistance at least 100% greater than the tear resistance of the coated fabric forming the sliding ply, positioned closely adjacent the surface of the sliding ply and obverse to a surface of the sliding ply upon which persons are being slid, the second ply being attached at edges thereof to one of the sliding ply and the inflatable tubular support members but otherwise being substantially unaffixed to the sliding ply between such edge attachments.

6. The device of claim 5, the second ply having a tear propagation resistance at least 500% greater than that of the sliding ply.

7. The device of claim 5, the second ply being formed form a ply of uncoated polyamide fabric.

8. The device of claim 5, the second ply being positioned to be not more than about two inches (5 cm) from the sliding ply.

* * * * *